R. STAR.
APPARATUS FOR INDICATING THE SPEED OF SHIPS.
APPLICATION FILED MAR. 19, 1912.

1,052,387.

Patented Feb. 4, 1913.
2 SHEETS—SHEET 2.

Witnesses
Byron B. Collings.
Edwin J. Beller.

Inventor
Richard Star,
by Wilkinson, Fisher & Witherspoon
his Attorneys

UNITED STATES PATENT OFFICE.

RICHARD STAR, OF THE UNITED STATES NAVY.

APPARATUS FOR INDICATING THE SPEED OF SHIPS.

1,052,387.　　　　Specification of Letters Patent.　　Patented Feb. 4, 1913.

Application filed March 19, 1912. Serial No. 684,782.

*To all whom it may concern:*

Be it known that I, RICHARD STAR, United States Navy, a citizen of the United States, stationed on board the U. S. S. Utah, have invented certain new and useful Improvements in Apparatus for Indicating the Speed of Ships; and I do hereby declare the following to be a full, clear, and exact description of the invention, such as will enable others skilled in the art to which it appertains to make and use the same.

My invention relates to improvements in apparatus for indicating the speed of ships, and it consists in the constructions, combinations and arrangements herein described and claimed.

An object of my invention is to provide an improved apparatus for indicating the speed of ships, adapted to operate accurately at all speeds and to be readily thrown into and out of use.

A further object of my invention is to provide an improved apparatus adapted to furnish on the ship's bridge, or any other convenient position, a visual indication of the ship's speed, and which can be readily adjusted, or set, to produce a visual indication of any desired amplitude or scale.

Figure 1:
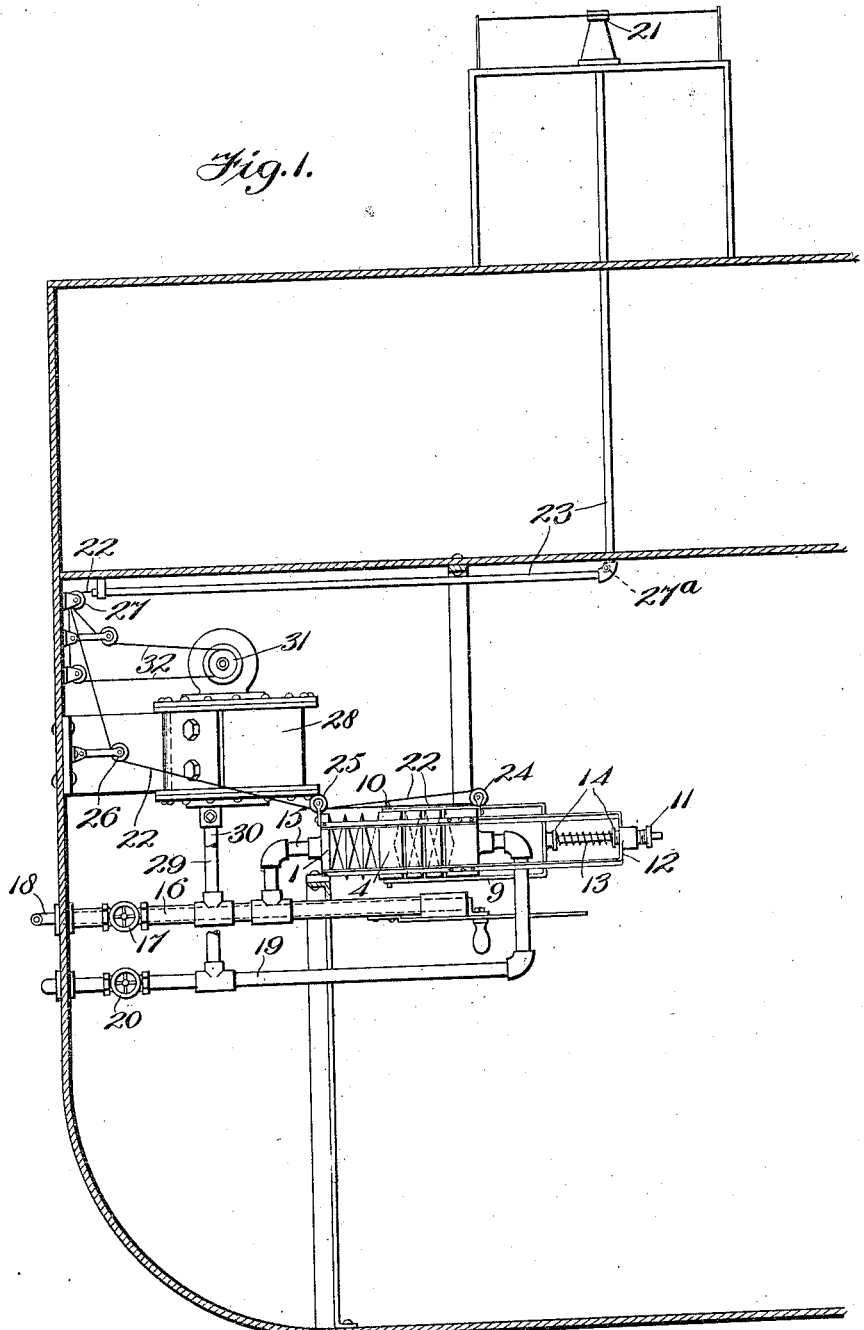
Figure 2:
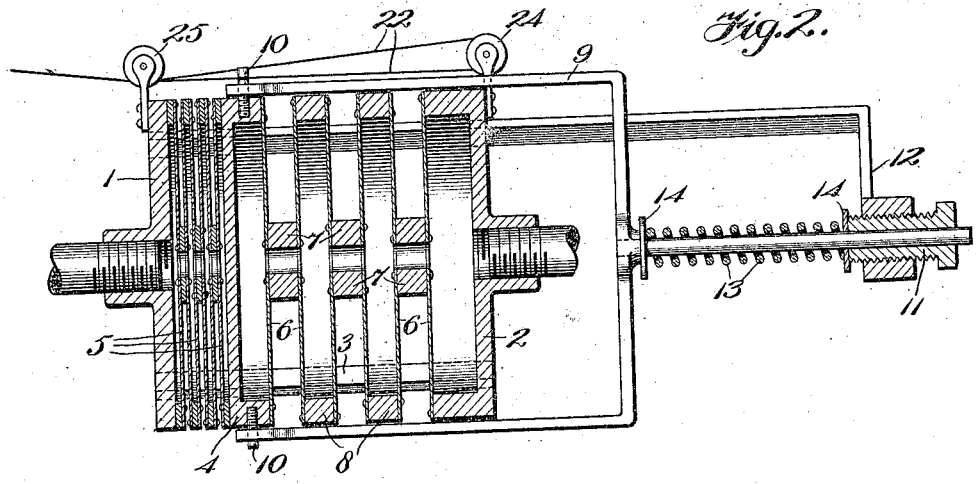
Figure 3:
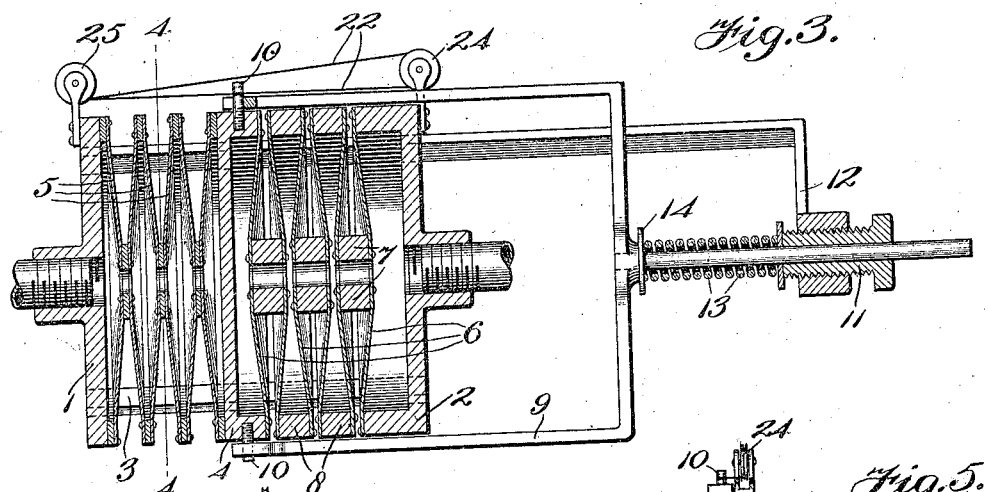
Figure 4:
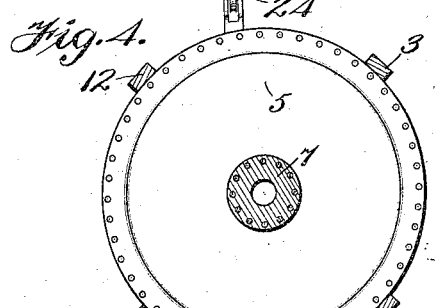
Figure 5:
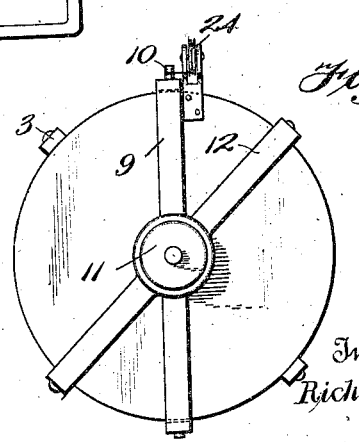

In the accompanying drawings forming a part of this application, and in which similar reference symbols indicate corresponding parts in the several views:—Figure 1 is a diagrammatic, transverse section of a ship, illustrating one embodiment of my invention applied thereto; Fig. 2 is an enlarged, vertical, axial section of the improved actuating device for the speed indicator shown in Fig. 1, the parts being shown in their inoperative position; Fig. 3 is a view similar to Fig. 2, showing the parts shifted into position for indicating the maximum speed for which the device is set; Fig. 4 is a section on the line 4—4 of Fig. 3; and Fig. 5 is an elevation of the right-hand end of Figs. 2 and 3.

Referring to the drawings, 1 and 2 indicate fixed heads secured together by braces 3, which constitute guides for a shiftable member, or head, 4. The heads 1 and 4 are connected by an expansible chamber, or bellows, comprising a series of diaphragms 5 formed of centrally-apertured disks of copper or other resilient material, which tend by their resiliency to normally maintain said chamber in collapsed position, as shown in Fig. 2. The heads 2 and 4 are similarly connected by a contractible chamber comprising resilient diaphragms 6 secured to relatively thick annular spacing members 7 and 8; the resilient diaphragms 6 tending to maintain said chamber in its normal expanded position shown in Fig. 2.

A yoke 9 is secured to the movable head 4 by pins 10 and slidably mounted in an adjustable stop 11 threaded in a standard 12, which latter is carried by the fixed head 1, or other stationary support. A spiral spring 13 is confined between disks 14 bearing against said yoke 9 and stop 11, and acts to augment the action of the resilient diaphragms in yieldingly maintaining the movable head 4 in its normal position shown in Fig. 2. The stop 11 can be readily adjusted to vary the tension of said spring 13 for accurately adjusting the actuating device to all various practical conditions, and for setting said device to produce a movement of the indicator corresponding to any desired scale.

The expansible chamber of the diaphragms 5 is connected by a pipe 15 to an inlet pipe 16 provided with a valve 17, and a telescoping section 18 having its outer end beveled to open forwardly in the direction of the ship's travel, similar to the inlet pipe shown in my prior Patent #988832, dated April 4, 1911, and the chamber of the diaphragms 6 is connected to a suction pipe 19 opening into the water of flotation rearwardly of the ship's travel, and provided with a valve 20, similar to the suction pipe shown in my said prior Patent #988832.

An indicator 21 is mounted on the bridge, or at any desired position, and actuatingly connected to a cable, or wire, 22 having its end attached to the pin 10 of the shiftable head 4; said wire passing through protecting tubes 23 and over guide pulleys 24, 25, 26, 27, and 27ª.

When the apparatus is to be used, the valves 17 and 20 are opened and the telescoping pipe section 18 shifted outwardly to place the inlet and suction pipes in communication with the water of flotation, all as fully shown and described in my said prior Patent #988832. In this position of the parts, the speed of the ship causes a strong current of water to be forced through the forwardly-directed open end of the inlet pipe to the pressure chamber formed by the diaphragms 5, and the rearwardly-directed open end of the suction pipe causes an injector action which produces a suction in the chamber formed by the diaphragms 6. The dynamic head of the water flotation, due to the speed of the ship therethrough, thus acts to produce a pressure on the front face of the movable head 4 and a suction on the rear face of said head; the combined action of such pressure and suction causing a positive and accurate shifting of the movable head 4 upon variations in the ship's speed.

A hydraulic motor 28 is shown connected by branch pipes 29 and 30 to the inlet and suction pipes 16 and 19; a pulley 31 being actuated by said motor to drive an endless cable 32 for operating any desired indicating device. This construction is fully shown and described in my said prior Patent #988832, and need not be further described herein.

I have illustrated and described preferred and satisfactory constructions, but changes could be made within the spirit and scope of my invention.

I claim:—

1. In an apparatus for indicating the speed of ships, the combination of a pair of expansible chambers, a common shiftable head for said pair of chambers, means for placing said chambers in communication with the water of flotation, and adjustable means for yieldingly maintaining said shiftable head in normal position.

2. In an apparatus for indicating the speed of ships, the combination of an indicator, a shiftable actuating member therefor, a pressure chamber comprising a series of closely-spaced resilient diaphragms connected to one face of said member, an inlet pipe communicating with said pressure chamber and opening into the water of flotation forwardly of the ship's travel, a suction chamber comprising a series of widely-spaced resilient diaphragms connected to the other face of said member, and a suction pipe leading from said suction chamber and opening into the water of flotation rearwardly of the ship's travel.

3. In an apparatus for indicating the speed of ships, the combination of an indicator, a shiftable actuating member therefor, a pressure chamber comprising a series of closely-spaced resilient diaphragms connected to one face of said member, an inlet pipe communicating with said pressure chamber and opening into the water of flotation forwardly of the ship's travel, a suction chamber comprising a series of widely-spaced resilient diaphragms connected to the other face of said member, a suction pipe leading from said suction chamber and opening into the water of flotation rearwardly of the ship's travel, and adjustable means for yieldingly maintaining said shiftable member in normal position.

4. In an apparatus for indicating the speed of ships, the combination of fixed heads, a head shiftably mounted therebetween, expansible chambers connecting the respective faces of said movable head with the adjacent fixed heads, a pipe communicating with one of said chambers and opening into the water of flotation forwardly of the ship's travel, and a pipe leading from the other of said chambers and opening into the water of flotation rearwardly of the ship's travel.

5. In an apparatus for indicating the speed of ships, the combination of fixed heads, a head shiftably mounted therebetween, expansible chambers connecting the respective faces of said movable head with the adjacent fixed heads, a pipe communicating with one of said chambers and opening into the water of flotation forwardly of the ship's travel, a pipe leading from the other of said chambers and opening into the water of flotation rearwardly of the ship's travel, and means for yieldingly maintaining said movable head in normal position.

6. In an apparatus for indicating the speed of ships, the combination of fixed heads, a head shiftably mounted therebetween, a pressure chamber comprising a series of closely-spaced resilient diaphragms connecting one face of said movable head with the adjacent fixed head, an inlet pipe communicating with said pressure chamber and opening into the water of flotation forwardly of the ship's travel, a suction chamber comprising a series of widely-spaced resilient diaphragms connecting the other face of said movable head with the adjacent fixed head, a suction pipe leading from said suction chamber and opening into the water of flotation rearwardly of the ship's travel, and adjustable means for yieldingly maintaining said shiftable head in normal position.

In testimony whereof, I affix my signature, in presence of two witnesses.

RICHARD STAR.

Witnesses:
T. E. ORR,
J. J. CRILLEY.

---

Copies of this patent may be obtained for five cents each, by addressing the "Commissioner of Patents, Washington, D. C."